(12) United States Patent
Park et al.

(10) Patent No.: US 11,152,603 B2
(45) Date of Patent: Oct. 19, 2021

(54) SAGGAR FOR FIRING ACTIVE MATERIAL OF LITHIUM SECONDARY BATTERY, AND METHOD FOR MANUFACTURING ACTIVE MATERIAL USING SAME

(71) Applicant: RESEARCH INSTITUTE OF INDUSTRIAL SCIENCE & TECHNOLOGY, Pohang-si (KR)

(72) Inventors: Young-Min Park, Pohang-si (KR); Soon-Cheol Hwang, Pohang-si (KR); Choong-Mo Yang, Seoul (KR); Woo-Taek Kim, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 224 days.

(21) Appl. No.: 16/309,482

(22) PCT Filed: Dec. 21, 2016

(86) PCT No.: PCT/KR2016/014992
§ 371 (c)(1),
(2) Date: Dec. 13, 2018

(87) PCT Pub. No.: WO2017/217625
PCT Pub. Date: Dec. 21, 2017

(65) Prior Publication Data
US 2019/0252669 A1    Aug. 15, 2019

(30) Foreign Application Priority Data

Jun. 13, 2016 (KR) .................. 10-2016-0072986
Aug. 10, 2016 (KR) .................. 10-2016-0101753

(51) Int. Cl.
*C04B 35/16* (2006.01)
*H01M 4/04* (2006.01)
(Continued)

(52) U.S. Cl.
CPC .......... *H01M 4/0471* (2013.01); *C04B 35/16* (2013.01); *C04B 35/185* (2013.01);
(Continued)

(58) Field of Classification Search
CPC ............................... C04B 35/16; C04B 35/48
See application file for complete search history.

(56) References Cited

U.S. PATENT DOCUMENTS 4,847,025 A     7/1989  White et al.
2002/0037810 A1  3/2002  Nakagawa et al.
(Continued)

FOREIGN PATENT DOCUMENTS

CN    87106230 A    7/1988
CN    101838138 B   9/2010
(Continued)

OTHER PUBLICATIONS

Chinese Office Action dated Dec. 8, 2020 for related Chinese Application No. 201680086756.X.
(Continued)

*Primary Examiner* — Andrew T Piziali
(74) *Attorney, Agent, or Firm* — Renner, Otto, Boisselle & Sklar, LLP

(57) ABSTRACT

The present invention relates to a saggar for firing an active material of a secondary battery, a method for manufacturing the saggar, and a method for firing the active material. The saggar for firing an active material of a secondary battery according to the present invention has a coating layer formed on a bottom surface or a wall surface thereof so as to collect carbon dioxide. By means of the coating layer, the concentration of the carbon dioxide in the saggar can be lowered by collecting the carbon dioxide that is a by-product resulting from a firing reaction, thereby enabling a reduction in the amount of remaining lithium in the active material.
(Continued)

The saggar of the present invention provides the saggar for firing an active material of a secondary battery, wherein the saggar has at least one through hole in the bottom surface, or the bottom surface and wall surfaces thereof so as to communicate a gas.

11 Claims, 2 Drawing Sheets

(51) Int. Cl.

| | | |
|---|---|---|
| C04B 41/87 | (2006.01) | |
| C04B 35/48 | (2006.01) | |
| C04B 35/195 | (2006.01) | |
| C04B 35/622 | (2006.01) | |
| C04B 35/66 | (2006.01) | |
| C04B 35/185 | (2006.01) | |
| C04B 35/443 | (2006.01) | |
| C04B 35/64 | (2006.01) | |
| F27D 5/00 | (2006.01) | |
| H01M 10/052 | (2010.01) | |

(52) U.S. Cl.
CPC .......... *C04B 35/195* (2013.01); *C04B 35/443* (2013.01); *C04B 35/48* (2013.01); *C04B 35/622* (2013.01); *C04B 35/64* (2013.01); *C04B 35/66* (2013.01); *C04B 41/87* (2013.01); *F27D 5/0068* (2013.01); *H01M 10/052* (2013.01)

(56) References Cited

U.S. PATENT DOCUMENTS

| | | |
|---|---|---|
| 2006/0018362 A1 | 1/2006 | Shike |
| 2006/0183625 A1 | 8/2006 | Miyahara |

FOREIGN PATENT DOCUMENTS

| | | | |
|---|---|---|---|
| CN | 103840148 A | | 6/2014 |
| CN | 105084921 A | | 11/2015 |
| CN | 105486081 A | * | 4/2016 |
| CN | 105486081 A | | 4/2016 |
| JP | 2004-281163 A | | 10/2004 |
| JP | 2005-257171 A | | 9/2005 |
| KR | 10-2002-0050390 A | | 6/2002 |
| KR | 10-2009-0055696 A | | 6/2009 |
| KR | 10-2010-0125127 A | | 11/2010 |
| KR | 10-1177545 B1 | | 8/2012 |
| KR | 10-2013-0051290 A | | 5/2013 |
| KR | 10-2013-0115688 A | | 10/2013 |
| KR | 10-1323096 B1 | | 10/2013 |
| KR | 101323096 B1 | * | 10/2013 |
| KR | 10-2015-0015394 A | | 2/2015 |
| WO | 2012/133525 A1 | | 10/2012 |

OTHER PUBLICATIONS

International Search Report and Written Opinion for corresponding Patent Application No. PCT/KR2016/014992 dated Mar. 24, 2017.
Wang, Shutao et al., "Syntheses and Structures of Lithium Zirconates for High-temperature CO2 Absorption", Journal of Materials Chemistry A, 2013, vol. 1, No. 11, pp. 3540-3550 See page 3544, 2.2.1 High-temperature and CO2 Chemisorption on Li2ZrO3 Section; p. 3547, 2.2.4 High-temperature CO2 Chemisorption on Li2ZrO3 Doped ,with Other Alkali Metals Section; and figure 11.

* cited by examiner

SAGGAR FOR FIRING ACTIVE MATERIAL OF LITHIUM SECONDARY BATTERY, AND METHOD FOR MANUFACTURING ACTIVE MATERIAL USING SAME

TECHNICAL FIELD

The present disclosure relates to a saggar for the firing of a secondary battery cathode active material, a method of manufacturing the saggar, and a method of manufacturing an active material using the saggar.

BACKGROUND ART

Lithium secondary batteries have been widely used as energy storage devices for mobile communications devices, hybrid electric vehicles, and household appliances, due to relatively high energy density, excellent output characteristics, and lightweightedness.

A core material of lithium secondary batteries is classified as an anode, a cathode, an electrolyte, or a separator. As a cathode material for a lithium secondary battery in current commercialization, LiCoO2 or nickel cobal manganese (NCM)-series cathode active material or the like is used. Such a cathode active material may be produced, by providing a raw material including a compound and a transition metal compound to a saggar, a firing vessel, and firing the raw material at a temperature ranging from 400° C. to 1100° C. depending on the type of the raw material, to produce a cathode active material such as a lithium composite oxide or the like.

In the process of producing a cathode active material of a lithium secondary battery, the firing process is usually performed in an atmosphere of air containing oxygen. In this case, when a firing atmosphere gas containing oxygen, such as oxygen, air or the like, supplied externally, may be easily circulated in a saggar to allow the raw material contained in the saggar to contact oxygen, firing efficiency may be improved.

On the other hand, since water vapor and carbon dioxide are generated as reaction byproducts in a firing process such as that described above, in detail, since carbon dioxide is heavier than oxygen and air used to control the firing atmosphere, carbon dioxide remains within the saggar to react with a lithium oxide on a cathode active material surface during a cooling process, thereby causing formation of lithium carbonate.

In the case in which the concentration of such residual lithium carbonate is increased, the dispersibility of slurry in a process of coating of a cathode active material is lowered or the capacity of a battery is decreased. Therefore, carbon dioxide generated during a process in a saggar is required to be smoothly discharged in a firing process of a cathode active material.

DISCLOSURE

Technical Problem

An aspect of the present disclosure is to provide a saggar having a structure in which the discharge of carbon dioxide generated in firing a cathode active material for a secondary battery, or the like, may be facilitated, and a method of manufacturing an active material using the same.

An aspect of the present disclosure is to provide a saggar coating material capable of suppressing the generation of lithium carbonate due to a reaction between carbon dioxide and a cathode active material, by a reaction of the saggar coating material with carbon dioxide generated when firing a cathode active material for a secondary battery, and a method of manufacturing a saggar.

Technical Solution

According to an aspect of the present disclosure, a saggar for the firing of an electrode active material for a secondary battery is provided, the saggar containing a firing material to be fired for production of the electrode active material therein. The saggar includes a coating layer disposed on an inner surface of the saggar, the coating layer being for capturing carbon dioxide.

The coating layer may include 30% to 70% by weight of $Li_2O$ and 30% to 70% by weight of $SiO_2$, or may include 5% to 25% by weight of $Li_2O$, 0% to 25% by weight of $K_2O$, and 60% to 90% by weight of $ZrO_2$.

The coating layer may have a thickness of 5 μm to 50 μm.

According to an aspect of the present disclosure, a coating composition of a saggar for the firing of an electrode active material for a secondary battery includes 30% to 70% by weight of $Li_2O$ and 30% to 70% by weight of $SiO_2$, on the basis of a solid.

The coating composition may further include a solvent, and the solid and the solvent may have a content of 1 wt % to 40 wt %: 60 wt % to 99 wt %.

The solvent may be water or alcohol.

According to an aspect of the present disclosure, a coating composition of a saggar for the firing of an electrode active material for a secondary battery includes 5% to 25% by weight of $Li_2O$, 0% to 25% by weight of $K_2O$, and 60% to 90% by weight of $ZrO_2$, on the basis of a solid.

The coating composition may further include a solvent, and the solid and the solvent may have a content of 1 wt % to 40 wt %: 60 wt % to 99 wt %.

The solvent may be water or alcohol.

According to an aspect of the present disclosure, a saggar for the firing of an active material for a secondary battery is provided, the saggar containing a firing material to be fired for production of an electrode active material of the secondary battery therein. The saggar includes at least one or more through-holes for a flow of gas, the at least one or more through-holes being disposed in a bottom surface or in a bottom surface and a wall surface of the saggar.

The one or more through-holes in the wall surface may be disposed between the bottom surface of the saggar and half of a height of the saggar.

In diameters of the at least one or more through-holes, a minimum diameter may be less than a particle size of the firing material.

The at least one or more through-holes may have a diameter ranging from 1 mm to 50 mm.

A total area of the through-holes of the bottom surface may be within a range of 0.10 to 20% with respect to a total area of the bottom surface.

An upper portion of the saggar may be open for an inflow and an outflow of the firing material, and the saggar may be provided with a lid covering the open upper portion.

Advantageous Effects

Since a saggar according to an exemplary embodiment includes through-holes in a bottom surface, or in a bottom surface and in a lower portion of a wall surface, carbon dioxide, a reaction byproduct in a process of firing a cathode active material, may be smoothly discharged from the saggar.

In addition, by using the saggar according to an exemplary embodiment, the amount of a raw material that may be loaded in the saggar may be increased, such that an active material may be produced in a relatively large quantity.

In addition, since a saggar according to an exemplary embodiment is coated with a substance, capable of capturing carbon dioxide, on an inner bottom surface, an inner wall surface or an outer wall of the saggar, the carbon dioxide, a reaction byproduct, in a process of firing a cathode active material, may be collected on an inner surface of the saggar, and thus, a concentration of lithium carbonate produced by the reaction between the cathode active material and the carbon dioxide may be effectively reduced.

Such carbon dioxide capture may lower a residual lithium concentration of a cathode active material, thereby improving dispersibility of cathode active material slurry and further improving the capacity of a battery.

BEST MODE FOR INVENTION

According to an exemplary embodiment, a saggar having a coating layer capable of facilitating collection of carbon dioxide produced as a byproduct in a firing process is provided.

A cathode active material for a secondary battery is generally manufactured by firing a raw material in a high-temperature firing furnace, and the raw material is loaded in a saggar to be introduced into a firing furnace. As described above, when an electrode active material for a secondary battery is fired in a saggar, oxygen, air, or the like, is used as atmospheric gas, and flows into the saggar through an upper portion thereof. In the firing process of the raw material, water vapor and carbon dioxide, reaction byproducts, are generated. In this case, since carbon dioxide is heavier than atmospheric gas, non-discharged carbon dioxide remains within the saggar and reacts with a lithium oxide provided on a surface of the cathode active material during a cooling process, to form lithium carbonate.

Thus, according to an exemplary embodiment, a saggar in which a coating layer formed of a carbon dioxide capturing material is formed on an inner surface of the saggar is provided. In the case in which a coating layer formed of a carbon dioxide capturing material is included as in the present disclosure, a concentration of residual lithium in a cathode active material due to carbon dioxide, not being discharged from the saggar, may be reduced, by collecting the carbon dioxide generated during a cathode active material firing process with the coating layer.

Figure 1:
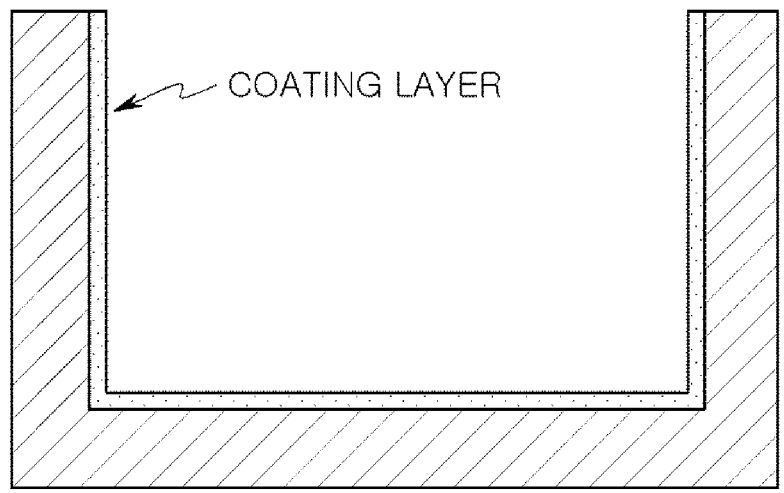
FIG. 1 is a front view illustrating an example of a saggar for the firing of a secondary battery active material according to an exemplary embodiment in the present disclosure, in which a coating layer for capturing carbon dioxide is formed on a bottom surface and a wall surface of the saggar.

As illustrated in FIG. 1, the coating layer may be formed, for example, on a bottom surface and a wall surface. Since the coating layer for capturing carbon dioxide is formed on the inner surface of the saggar, the concentration of carbon dioxide produced by a firing reaction may be reduced, and thus the residual lithium concentration of the cathode active material may be reduced.

The coating layer for capturing carbon dioxide may also be formed on an outer wall and an external bottom surface of the saggar. The carbon dioxide capture coating layer according to an exemplary embodiment is intended to adsorb or discharge carbon dioxide depending on temperature. For example, in a case in which both an inner surface and an external surface of the saggar are coated, a reaction area may be increased, which may increase to adsorb carbon dioxide.

The coating layer may be formed by coating a $Li_2O$—$SiO_2$-based coating composition. In the coating layer, $Li_2O$ may react with $SiO_2$ to form a lithium silicate ($Li_{2n}SiO_{n+2}$, n=1, 2, 3, 4 or 5) coating layer having various compositions, such as $Li_2SiO_3$, $Li_4SiO_4$, $Li_6SiO_5$, or $Li_8SiO_6$, and may have properties converted into a complex of $Li_2CO_3$ and $SiO_2$ when absorbing carbon dioxide.

The $Li_2O$—$SiO_2$-based coating composition is not particularly limited, but may include 30 to 70% by weight of $Li_2O$ and 30 to 70% by weight of $SiO_2$. If substances other than $Li_{2n}SiO_{n+2}$ are present, a carbon dioxide absorbing ability is lowered. Thus, the contents of $Li_2O$ and $SiO_2$ may each be 30 to 70% by weight.

The coating composition may include a solvent. As the solvent, an alcohol-based solvent such as ethanol, ethylene glycol, isopropyl alcohol or the like, may be used, or water may also be used. In this case, a solids content and a solvent content may have a weight ratio of 1 to 40:60 to 99. If the solids content is less than 1% by weight, it is difficult to form a uniform coating layer on the entire surface of the saggar. If the solids content exceeds 40% by weight, since the viscosity of slurry is relatively high, a coating process may not be facilitated. Thus, for example, the weight ratio of a solid to a solvent may be 1:99, 3:97, 5:95, 10:90, 15:85, 20:80, 25:75, 30:70, 35:65, 40:60, or the like, from which an upper limit and a lower limit of the weight ratio may be selected by various combinations thereof.

The coating layer may be formed by applying such a coating composition to the interior of a body of the saggar and selectively to an external surface thereof and then by performing a heat treatment on the body of the saggar. In this case, the heat treatment may be performed at a temperature ranging from 900 to 1200° C. The heat treatment time is not particularly limited, but for example, the heat treatment may be performed for 2 hours to 6 hours in terms of suppressing a reaction between the coating layer and a cathode material during a cathode material calcination process.

Thus, in the case of the saggar having a coating layer including $Li_2O$ and $SiO_2$, for example, in the case of the saggar having a $Li_2SiO_3$ coating layer, the coating layer may react with $CO_{-2}$ at a temperature of less than about 550° C. to be converted into a layer having $Li_2CO_3$ and $SiO_2$, to lower a $CO_2$ concentration around the saggar. For example, when the concentration of $CO_2$ around the saggar decreases, a residual Li concentration of the cathode material may decrease, and thus, the production of cathode material slurry may be facilitated, and the reliability of a secondary battery may be improved.

The coating layer is not particularly limited, but may have a thickness of 5 to 50 μm. As the thickness of the coating layer formed of a cathode material increases, the increase in the thickness thereof may be advantageous in terms of capture of $CO_2$, but if the thickness of the coating layer is relatively great, separation may occur during the firing process due to a difference in thermal expansion coefficient between a saggar and a coating layer, which may act as an impurity of the cathode material. Thus, the coating layer may have a thickness ranging from 5 to 50 μm as described above.

In another embodiment, the coating layer may be formed by coating a $Li_2O$—$K_2O$—$ZrO_2$-based coating composition. In the coating layer, $LiO_2$ reacts with $ZrO_2$ to form $Li_2ZrO_3$ to provide a $CO_2$ absorption effect. On the other hand, for example, when $K_2O$ is replaced with $Li_2O$, a melting point of $Li_2ZrO_3$ decreases, and thus, a carbon dioxide adsorption temperature may be reduced, thereby further increasing adsorption efficiency.

The $Li_2O$—$K_2O$—$ZrO_2$-based coating composition is not particularly limited, but may include 5 to 25% by weight of $Li_2O$, 0 to 25% by weight of $K_2O$, and 60 to 90% by weight of $ZrO_2$. If the content of $Li_2O$ is less than 5% by weight, the amount of production of $Li_2ZrO_3$ is decreased to decrease the ability to adsorb carbon dioxide. If the content of $Li_2O$ exceeds 25% by weight, the amount of production of $Li_2ZrO_3$ is reduced to lower a $CO_2$ absorption effect. In addition, an excess amount of $Li_2O$ remaining after the production of $Li_2ZrO_3$ reacts with $CO_2$ in air in advance to generate $Li_2CO_3$, which does not contribute to the absorption of $CO_2$ present in the saggar after firing the active material.

If the content of $ZrO_2$ is less than 60% by weight, as a result, $Li_2O$ is present in an excessive amount, so that $Li_2O$ absorbs $CO_2$ in advance and may not exhibit required $CO_2$ absorption ability. Further, if the content of $ZrO_2$ exceeds 90% by weight, there is also a problem in which a $CO_2$ absorption ability is reduced.

On the other hand, $K_2O$ reacts with $ZrO_2$ to generate $K_2ZrO_3$ to provide $CO_2$ absorption capability, as well as to reduce a melting point of $Li_2ZrO_3$, thereby controlling a $CO_2$ absorption temperature, which may be obtained by replacing a portion of $Li_2O$ with $K_2O$ or by adding $K_2O$ additionally. Thus, $K_2O$ may be added to adjust the $CO_2$ absorption temperature, but if the content of $K_2O$ exceeds 25% by weight, the contents of $LiO_2$ and $ZrO_2$ for production of $Li_2ZrO_3$ being relatively excellent in carbon dioxide adsorption ability may be relatively lowered, thereby lowering carbon dioxide adsorption capability.

The $Li_2ZrO_3$ and $K_2ZrO_3$ may absorb carbon dioxide to be converted into $Li_2CO_3$ and $K_2CO_3$ and $ZrO_2$, and a coating layer of various compositions, such as $Li_2ZrO_3$, $K_2ZrO_3$, $Li_2CO_3$, $ZrO_2$, or the like, may be formed on a surface of the saggar.

The coating composition may include a solvent. As the solvent, an alcohol-based solvent such as ethanol, ethylene glycol, isopropyl alcohol or the like may be used, or water may also be used. In this case, a solids content and a solvent content may have a weight ratio of 1 to 40:60 to 99. If the solids content is less than 1% by weight, it is difficult to form a uniform coating layer on the entire surface of the saggar. If the solids content exceeds 40% by weight, since the viscosity of slurry is relatively high, a coating process may not be facilitated. Thus, for example, the weight ratio of a solid to a solvent may be 1:99, 3:97, 5:95, 10:90, 15:85, 20:80, 25:75, 30:70, 35:65, 40:60, or the like, from which an upper limit and a lower limit of the weight ratio may be selected by various combinations thereof.

The coating layer may be formed by applying the coating composition as described above to the inner surface of a saggar body and selectively to the external surface thereof, and then, by heat treating the saggar body. In this case, the heat treatment may be performed at a temperature ranging from 900 to 1200° C. The heat treatment time is not particularly limited, but for example, the heat treatment may be performed for 2 hours to 6 hours in terms of suppressing a reaction between the coating layer and a cathode material during a cathode material calcination process. The heat treatment for 2 hours or longer may be required, such that the coating layer may have sufficient strength by being combined with the saggar surface. If the heat treatment time exceeds 6 hours, cracking may occur due to excessive firing of the coating layer.

Thus, in the case of the saggar having a coating layer including $Li_2O$—$K_2O$—$ZrO_2$, for example, in the case of the saggar having a $Li_2ZrO_3$ coating layer, the coating layer may react with $CO_2$ at a temperature of less than about 550° C. to be converted into a layer having $Li_2CO_3$ and $ZrO_2$, to lower a $CO_2$ concentration around the saggar. Thus, for example, when the concentration of $CO_2$ around the saggar decreases, a residual Li concentration of the cathode material may decrease, and thus, the production of cathode material slurry may be facilitated, and the reliability of a battery may be improved.

The coating layer is not particularly limited, but may have a thickness of 5 to 50 μm. As the thickness of the coating layer formed of a cathode material increases, the increase in the thickness thereof may be advantageous in terms of capture of $CO_2$, but if the thickness of the coating layer is relatively great, separation may occur during the firing process due to a difference in thermal expansion coefficient between the saggar and the coating layer, which may act as an impurity of the cathode material.

In addition, the saggar according to an exemplary embodiment may have a structure in which atmospheric gas may smoothly flow from the outside thereof into the interior of the saggar and a byproduct produced in the firing process, such as carbon dioxide or the like, may be easily discharged from the interior of the saggar.

As described above, as the coating layer capable of capturing carbon dioxide is formed in the saggar, carbon dioxide remaining on the surface of the saggar may be captured by the collating layer, to reduce a residual lithium concentration of a cathode active material. In this case, to obtain the cathode active material having a uniform quality by firing, smooth flow of the atmospheric gas into the saggar may be required, thereby preventing carbon dioxide from remaining in the saggar.

To this end, a saggar according to an exemplary embodiment may have a through-hole formed therein. In the case of the saggar including the coating layer capable of capturing carbon dioxide, the through-hole may be formed, and even in a case in which the saggar does not include a coating layer, the through-hole may also be formed to allow for a smooth flow of atmospheric gas to suppress residual of carbon dioxide in the saggar.

In the case of performing firing using a general saggar according to the related art, atmospheric gas flows into the saggar through an upper portion of the saggar, but the atmospheric gas mainly comes into contact with a raw material located in an upper layer portion of raw materials loaded in the saggar, while probability of contact with respect to a raw material located in a relatively deep part such as a bottom surface of the saggar is relatively low. Thus, it is difficult to obtain a uniform firing quality.

However, according to an exemplary embodiment in the present disclosure, since the through-holes are formed in the saggar, atmospheric gas may be supplied into the saggar through the through-holes, such that the atmospheric gas may be uniformly supplied to a raw material of a cathode active material loaded in the saggar, thereby obtaining a uniform firing quality.

Figure 2:
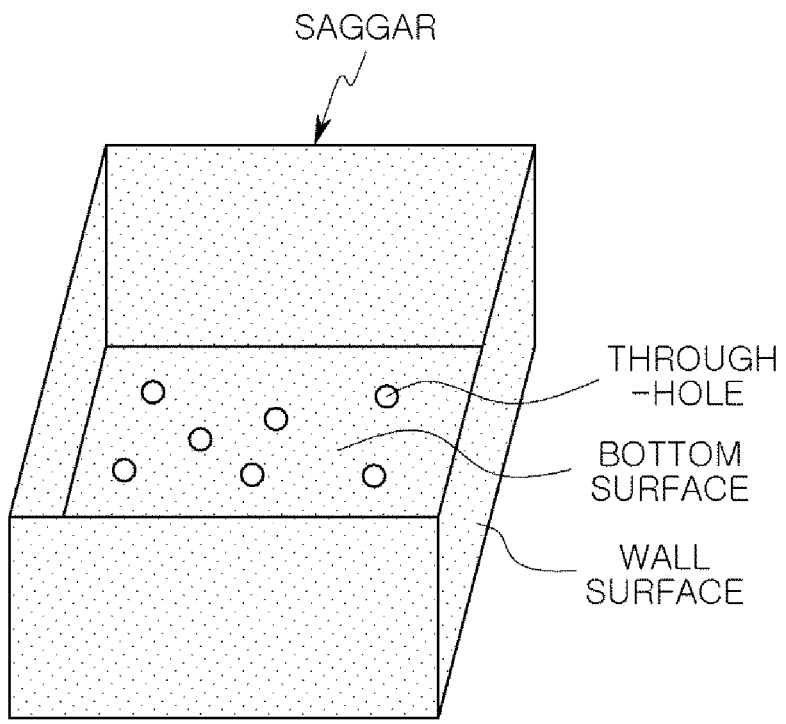
FIG. 2 is a perspective view illustrating an example of a saggar for the firing of a secondary battery active material, in which through-holes are formed in a bottom surface of the saggar, according to an exemplary embodiment in the present disclosure.
Figure 3:
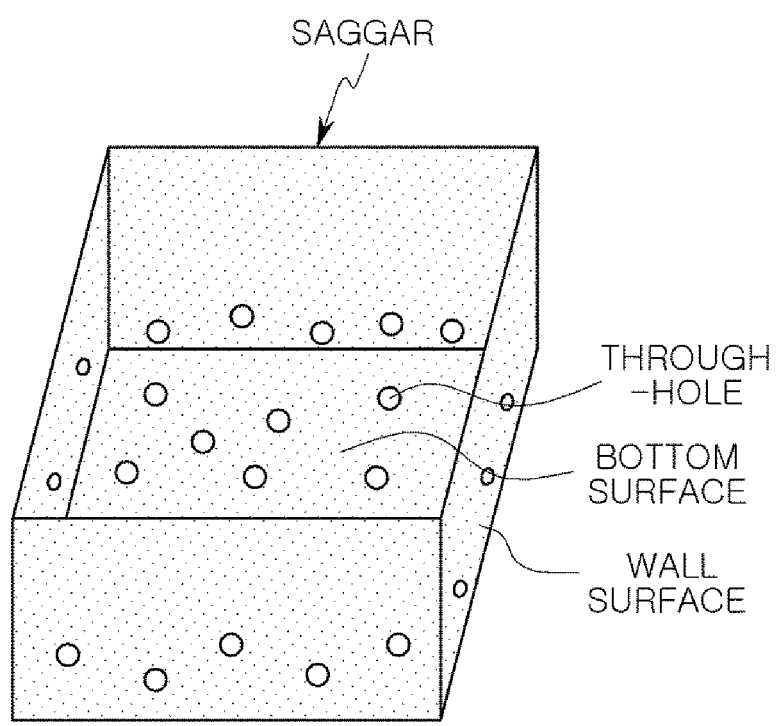
FIG. 3 is a perspective view illustrating an example of a saggar for the firing of a secondary battery active material, in which through-holes are formed in a bottom surface and a wall surface of the saggar, according to an exemplary embodiment in the present disclosure.

Such through-holes may be formed in the bottom surface of the saggar as illustrated in FIG. 2, or may be formed in the bottom and in wall surfaces of the saggar as illustrated in FIG. 3. Atmospheric gas of a firing furnace, in detail, oxygen, may be introduced into the saggar through the through-holes formed in the bottom surface of the saggar, and may be raised to an upper portion in the saggar while uniformly contacting the raw material loaded in the saggar, thereby producing a homogeneous firing material.

On the other hand, for example, when the saggar includes the through-holes formed in the wall surface, the atmospheric gas may be introduced into the saggar in the flow of the atmospheric gas flowing to a side of the saggar.

As described above, the through-holes may facilitate a smooth flow of the atmospheric gas into the interior of the saggar, and may also allow byproducts such as carbon dioxide, water vapor and the like generated during firing to be smoothly discharged from the interior of the saggar.

If carbon dioxide remains in the saggar, lithium oxide and lithium carbonate are formed on the surface of a cathode active material during a cooling process after firing, thereby causing a problem in which dispersibility of slurry is degraded in a coating process of a cathode active material or the capacity of a battery is decreased. However, according to an exemplary embodiment in the present disclosure, when through-holes are formed in a bottom surface or a side wall of the saggar, the flow of gas may occur due to the inflow of atmospheric gas through the through-holes, thereby suppressing carbon dioxide or water vapor from being concentrated on an inner wall and an inner bottom of the saggar.

The size of the through-holes of the saggar is not particularly limited, but a minimum diameter in diameters of the through-holes may be less than that of a raw material for production of an active material, a firing material, in terms of suppressing outflow of the raw material through the through-holes.

For example, in the case of using the saggar in which such through-holes are formed in another aspect, a raw material may be molded to have the size having a predetermined particle size and then loaded in the saggar to then be fired. Thus, the outflow of the raw material through the through-holes may be suppressed, and gaps between the raw material particles may thus be relatively large to allow the flow of atmospheric gas to be smooth.

The diameter of the through-holes formed in the saggar may be adjusted depending on the size of firing material particles loaded in the saggar, and the particle size of the firing material particles stored in the saggar may be adjusted depending on the diameter of the through-holes. Thus, although the diameter of the through-holes is not particularly limited, since oxygen, air, carbon dioxide, water vapor, and the like should be easily enter and exit through the through-holes, the diameter of the through-hole may be 1 mm or more. In addition, as the diameter size of the through-hole increases, mechanical strength of the saggar may decrease, and thus, the through-hole may have a diameter of 50 mm or less.

On the other hand, although the through-holes formed in a side wall of the saggar may be formed on the entire surface of the side wall, the through-holes may be formed within a region ranging from the bottom of the saggar to half the height of the side wall of the saggar, thereby obtaining a sufficient effect for the inflow of atmospheric gas and the discharge of reaction byproducts. Of course, when the through-holes are formed in the region, including an upper portion of the side wall, the atmospheric gas may flow more smoothly into the saggar, thereby improving firing efficiency of a raw material.

The shape of the through-hole formed in the bottom or wall surface of the saggar is not particularly limited. For example, the through-hole may have a circular, elliptical or polygonal cross-sectional shape, or the like, or may have a shape obtained by combining two or more of these shapes. In addition, the through-hole may have various shapes that are not defined by such shapes, and any regular or irregular shape may be used as long as it may introduce atmospheric gas and discharge reaction byproducts.

In an exemplary embodiment, through-holes formed in a bottom surface of the saggar may be formed in a range occupying an area of 0.1 to 20% by areas with respect to a total area of the bottom surface of the saggar. If the area occupied by the through-holes formed in a bottom surface of the saggar is less than 0.1% by area, the inflow of atmospheric gas such as air, oxygen or the like, or the discharge of carbon dioxide or water vapor may not be smooth, and the effect due to the formation of the through-holes may thus be insufficient. If exceeding 20% by area, strength of the saggar may be lowered, and the probability that the saggar will be broken during a firing process in a roller hearth kiln (RHK) may be increased.

A material of such a saggar is not particularly limited, and for example, mullite ($3Al_2O_3 2SiO_2$), cordierite (($Mg$, $Fe^{+3}$)$_2Al_4Si_5O_{18}$), spinel ($MgAl_2O_4$), zircon ($ZrSiO_4$), or the like may be used. As in the combination of two or more as described above, a material generally used for a saggar may be used.

In addition, the saggar may be disposed in the firing furnace, in the form in which an upper portion of the saggar is open as required. Alternatively, a firing process may also be performed in the firing furnace by covering the upper portion of the saggar with a lid, and in this case, the lid may include through-holes formed therein for the flow of gas. By using the lid in this manner, the inflow of foreign substance into the saggar may be suppressed, and the flow of gas may be smooth by having the through-holes.

A method for producing an active material is not particularly limited. Except for using the saggar provided according to an exemplary embodiment in the present disclosure, a general method for producing an active material may be applied thereto. For example, a raw material may be loaded in the saggar according to an exemplary embodiment in the present disclosure, the saggar in which the material to be fired is loaded may be disposed in a firing furnace, firing may be performed in an oxygen-containing gas atmosphere or an inert gas atmosphere in the firing furnace, and a secondary battery active material may be obtained by removing the fired raw material of the saggar from the firing furnace after firing, and then, by cooling and crushing the fired raw material.

In this case, the raw material may be used by being loaded in the form of powder in the saggar, and may also be loaded in the saggar by increasing the size of raw material particles in the powder state.

In addition, the number of the saggars disposed in the firing furnace may be one, or two or more. In this case, a plurality of saggars may be arranged as a single layer, or two or more saggars may be stacked in two or more layers, thereby performing firing. Since the saggar according to an exemplary embodiment in the present invention is formed with through-holes in the bottom, even in the case in which the saggars are stacked in two or more layers, atmospheric gas introduced into through-holes of a bottom or a sidewall of a lower saggar may also be introduced through through-holes formed in a bottom of an upper saggar and through-holes of an upper layer sidewall.

MODE FOR INVENTION

Hereinafter, embodiments in the present disclosure will be described in more detail. The following embodiments illustrate an exemplary embodiment in the present disclosure, but the present invention is not limited thereto.

Embodiment 1

A slurry was prepared by using ethanol as a solvent, so that 30 to 70% by weight of $Li_2O$ and 30 to 70% by weight of $SiO_2$ were contained and such a solids content was 10% (a weight ratio of solids content to solvent content=10:90), on an inner surface (a bottom surface and a wall surface) of a saggar body formed of a mullite material.

A coating layer formed on the inner surface of a saggar was a $Li_4SiO_4$ layer having a thickness of 10 μm.

The saggar formed with the coating layer was filled with a raw material powder ($Li_2CO_3$ and $Ni0.6C0.2Mn0.2(OH)_2$) for production of a cathode active material, and then, the saggar was disposed in a firing furnace.

The firing furnace was fired at 880° C. while introducing air as an oxygen-containing gas into the firing furnace.

After firing, the saggar was taken out from the firing furnace and cooled to obtain a cathode active material.

A residual lithium amount and coin cell characteristics were measured with respect to the obtained cathode active material, and the results are illustrated in Table 1.

Comparative Example 1

A cathode active material was prepared by firing and cooling in the same manner as in Embodiment 1, except that a saggar without a coating layer on bottom and wall surfaces was used.

A residual lithium amount and coin cell characteristics were measured with respect to the produced cathode active material, and the results are illustrated in Table 1.

TABLE 1

|  | Embodiment 1 | Comparative Example 1 |
| --- | --- | --- |
| Residual LiOH (ppm) | 800 | 1000 |
| Residual $Li_2CO_3$ (ppm) | 1600 | 2500 |
| Initial discharge capacity (mAh/g, @ 0.1 C) | 176 | 175 |
| Initial Charge/Discharge Efficiency (%) | 91 | 90 |
| Cycle life ($50^{th}/1^{st}$ @ 1 C) | 98 | 97 |

As can be seen from the above Table 1, in the case of Embodiment 1 using the saggar having the carbon dioxide capture coating layer formed on the bottom surface and the wall surface, the residual amount of LiOH and lithium carbonate was decreased by 30% or more, as compared with Comparative Example 1 using the saggar having no coating layer. Further, it can be seen that in Embodiment 1, the initial discharge capacity, initial charge/discharge efficiency, and cycle life are improved to improve the coin cell characteristics, as compared with Comparative Example 1.

Embodiment 2

As illustrated in FIG. 2, a saggar having 16 circular through-holes with a diameter of 5 mm in the bottom was filled a raw material powder (LiOH) for production of a cathode active material, and then disposed in a firing furnace. Firing was performed while injecting air as an oxygen-containing gas into the firing furnace.

After firing, the saggar was removed from the firing furnace and then cooled to obtain a cathode active material.

A residual lithium amount and coin cell characteristics were measured with respect to the obtained cathode active material, and the results are illustrated in Table 2.

Comparative Example 2

A cathode active material was prepared by firing and cooling in the same manner as in Embodiment 2, except that a saggar having no through-hole in the bottom was used.

A residual lithium amount and coin cell characteristics were measured with respect to the produced cathode active material, and the results are illustrated in Table 2.

TABLE 2

|  | Embodiment 2 | Comparative Example 2 |
| --- | --- | --- |
| Residual LiOH (ppm) | 600 | 1000 |
| Residual $Li_2CO_3$ (ppm) | 1500 | 2500 |
| Initial discharge capacity (mAh/g, @ 0.1 C) | 176 | 175 |
| Initial Charge/Discharge Efficiency (%) | 91 | 90 |
| Cycle life ($50^{th}/1^{st}$ @ 1 C) | 98 | 97 |

As can be seen from the Table 2, in the case of Embodiment 2, in which the saggar was used with the through-holes in the bottom surface, the residual amount of LiOH and lithium carbonate was reduced by 30% or more, as compared with Comparative Example 2 using the saggar without a through-hole. Furthermore, it can be seen that in Embodiment 2, the initial discharge capacity, the initial charge/discharge efficiency, and the cycle life are improved to improve the coin cell characteristics, as compared with Comparative Example 2.

The invention claimed is:

1. A saggar for firing of an electrode active material for a secondary battery, the saggar containing a firing material to be fired for production of the electrode active material therein, the saggar comprising:
    a coating layer disposed on an inner surface of the saggar, the coating layer being for capturing carbon dioxide, the coating layer consisting of 30% to 70% by weight of $Li_2O$ and 30% to 70% by weight of $SiO_2$.
2. The saggar of claim 1, wherein the coating layer has a thickness of 5 μm to 50 μm.
3. The saggar of claim 1, wherein the coating layer is formed using a coating composition comprising:
    30% to 70% by weight of $Li_2O$ and 30% to 70% by weight of $SiO_2$, on the basis of a solid.

4. The saggar of claim 3, wherein the coating composition further comprises a solvent,
wherein the solid and the solvent have a content of 1 wt % to 40 wt %: 60 wt % to 99 wt %.

5. The saggar of claim 4, wherein the solvent is water or alcohol.

6. The saggar of claim 1, wherein the saggar comprises at least one or more through-holes for a flow of gas, the at least one or more through-holes being disposed in a bottom surface or in a bottom surface and a wall surface of the saggar.

7. The saggar of claim 6, wherein the one or more through-holes in the wall surface are disposed between the bottom surface of the saggar and half of a height of the saggar.

8. The saggar of claim 6, wherein the at least one or more through-holes have a diameter ranging from 1 mm to 50 mm.

9. The saggar of claim 6, wherein a total area of the through-holes of the bottom surface is within a range of 0.1% to 20% with respect to a total area of the bottom surface.

10. The saggar of claim 6, wherein an upper portion of the saggar is open for an inflow and an outflow of the firing material, and the saggar is provided with a lid covering the open upper portion.

11. The saggar of claim 8, wherein in diameters of the at least one or more through-holes, a minimum diameter is less than a particle size of the firing material.

* * * * *